United States Patent

[11] 3,596,527

| [72] | Inventor | Alfred Den Besten<br>Fulton, Ill. |
|---|---|---|
| [21] | Appl. No. | 828,591 |
| [22] | Filed | May 28, 1969 |
| [45] | Patented | Aug. 3, 1971 |
| [73] | Assignees | Joseph T. Chester;<br>Richard A. Kummerer<br>Fulton, Ill., part interest to each |

[54] CHAIN AND SPROCKET ASSEMBLY
5 Claims, 4 Drawing Figs.

[52] U.S. Cl. ................................................ 74/229,
74/243, 74/250
[51] Int. Cl. ...................................................... F16h 7/06,
F16h 55/30, F16g 13/02;
[50] Field of Search............................................ 74/229,
243, 245, 249, 250

[56] References Cited
UNITED STATES PATENTS

| 2,259,937 | 10/1941 | Klaucke ...................... | 74/243 |
| 2,869,380 | 1/1959 | Lemmon ..................... | 74/245 |
| 3,054,301 | 9/1962 | Kummerer et al. ........... | 74/250 |
| 3,304,792 | 2/1967 | Kardol......................... | 74/243 X |
| 3,359,814 | 12/1967 | Kummerer et al. .......... | 74/245 |
| 3,365,970 | 1/1968 | Steorts ........................ | 74/249 |
| 3,448,629 | 6/1969 | Pfrank et al. ................. | 74/243 X |

OTHER REFERENCES
German Printed Application #1,040,335; Trippe; 10/58.

*Primary Examiner*—Leonard H. Gerin
*Attorney*—William A. Murray

ABSTRACT: A chain and sprocket drive in which the chain is composed of a plurality of joined U-shaped links and the sprocket has annular shoulders on opposite sides of its teeth on which the sides of the links may ride so as to retain the bight portion of the links out of contact with the base portions of the teeth.

PATENTED AUG 3 1971

3,596,527

*INVENTOR.*
ALFRED DENBESTEN

BY William A. Murray

ATTORNEY

CHAIN AND SPROCKET ASSEMBLY

BACKGROUND OF INVENTION

This invention relates to a sprocket and chain drive in which the links of the chain are guided on annular shoulders on the sprockets so that the transverse portions extending between the teeth are held radially outwardly in respect to the bases of the teeth so as to prevent wear at the base of the teeth.

It has heretofore been known to construct a chain link from a single metal strap by shaping the strap into a U-shaped link with the bight portion being arcuate in cross section. The open ends of the links are connected by connecting pins to the closed ends of adjacent links and the arcuate portions normally bear against the sides of the sprocket teeth and the inner transverse edge of the arcuate portion bears against the base of the sprocket teeth. Such a structure is shown in U.S. Pat. No. 3,054,301 which issued to Richard A. Kummerer, Alfred DenBesten and Joseph T. Chester on Sept. 18, 1962.

One problem that exists in the above type of chain is that the chain links pivot relative to one another as the chain moves around the sprocket, and the innermost transverse edge of the link wipes or scrapes against the base areas of the sprocket teeth. The sprockets are of cast material and comparatively soft. The chain links are of hard steel and consequently the wiping of the inner edge of the link tends to gouge the sides and base of the teeth, which causes early failure of the sprocket and improper tension in the chain.

SUMMARY

With the above in mind, it is the primary object of the present invention to provide annular shoulders or guides on the sprockets that contact the inner edges of the chain link sides and retain the links radially and spacedly outwardly of the teeth bases so that the lower edge of the transverse portion is not in contact with the sprocket.

The length of the respective links, as measured by the distance between the transverse portions of adjacent links, is slightly greater than the chordal distance between the points of link contact with adjacent teeth. Consequently, only one tooth is in contact with the chain link at any one time and is driving the chain, or is being driven by the chain as the case may be. This feature permits only the arcuate bight portion of the chain to be in contact with the sprocket teeth, which further insures against gouging the teeth.

Figure 1:
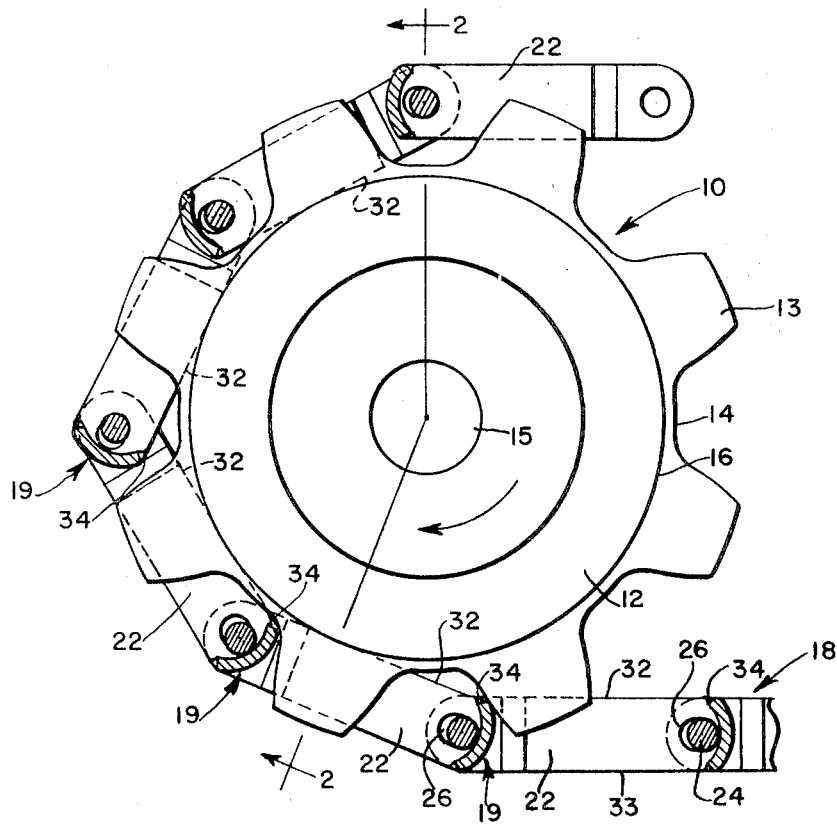
FIG. 1 is a side view of a chain and sprocket assembly having the features of the present invention.

The present construction relates to a sprocket and chain drive. The sprocket 10 is composed of cast material and has hub portions 11, 12 on opposite axial sides of sprocket teeth 13. The sprocket 10 has base surfaces or areas 14 between the teeth. The sprocket 10 has a central opening 15 for receiving a shaft. The hub portions 11, 12 of the sprocket 10 have outer annular shoulders 16, 17 extending axially from opposite sides of the sprocket. The shoulders 16, 17 are radially inwardly of but close to the base areas of the teeth 13.

Figure 3:
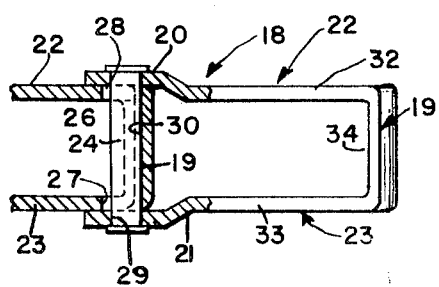
FIG. 3 is a plan view, partially in section, of a portion of the chain.

A chain is of a type shown and described in U.S. Pat. No. 3,054,301 and includes a series of interconnected U-shaped links 18 with each link being composed of a cross portion 19 forming the end of the link. The portion 19 is arcuate shaped. The link also has a pair of sides or legs 22, 23 having outwardly offset end portions 20, 21. As may best be seen from viewing FIG. 3, the offset portions 20, 21 fit alongside and outwardly of the sides at the ends of the adjacent links. The offset portions 20, 21 have openings 28, 29 aligned with openings 26, 27 in the sides 22, 23 at the narrow end portion of the adjacent links and a link pin 24 extending through the respective openings for interconnecting the links together. The openings 26, 27 are larger than the pin 24 so as to permit some free play and thereby compensate for variation in alignment between the openings and to permit some self-adjusting in the chain when in operation.

The arcuate-shaped end or cross piece has inner and outer arcuate surfaces 30, 31 respectively with the outer surface 31 engaging the sprocket teeth 13 and the inner surface being in contact with the pin 24. In respect to the sprocket axis when the chain moves around the sprockets, the sides 22, 23 have inner edges 32 and outer edges 33, and the arcuate portion 19 has an inner edge 34 and an outer edge 35.

In combination with the sprocket 10, the length of each chain link, as measured between adjacent link pins 24, is greater than the distance between the sprocket teeth, as measured at the area on the respective teeth that contact the arcuate crosspiece 19.

Figure 2:
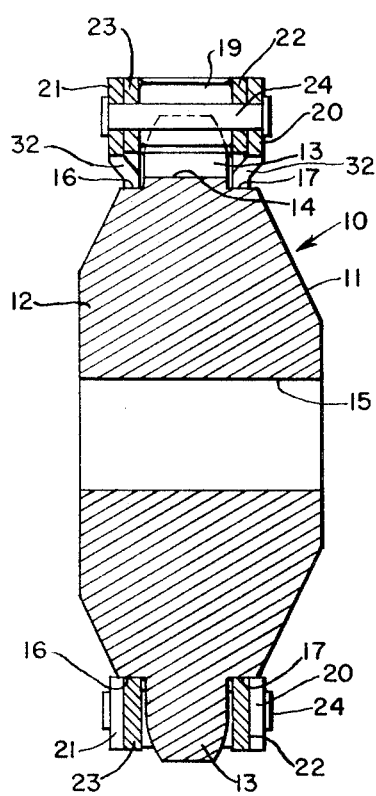
FIG. 2 is a sectional view taken along the line 2-2 of FIG. 1.
Figure 4:
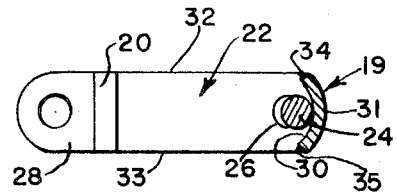
FIG. 4 is a vertical sectional view of a chain link and pin taken along the centerline of the link.

Referring now to the operation of the sprocket and chain as shown in FIGS. 1 and 2, the sprocket 10 is a drive sprocket and rotates in the direction of the arrow shown in FIG. 1. The inner edges 32 of the link sides 22, 23 ride against the shoulders 16, 17. This limits contact between the inner edge 34 of the arcuate portion 19 and the teeth 13 to only the period in which the first or initial contact is made between each tooth and the arcuate portion. This may best be seen on the underside of the chain drive as shown in FIG. 1. Immediately after contact, however, the edges 32 force the edge 34 out of contact with the sprocket, and causes the side of the tooth to engage the arcuate outer side of the portion 19. This construction, therefore, prevents gouging of the comparatively harder edge 34 into the comparatively soft cast tooth 13. The relatively flat edges 32 riding on the shoulders 16, 17 of the sprocket will be the primary points of wear, and will be far more resistant to wear when compared to an edge such as at 34 pivoting into a side of a tooth. It should also be noted that only the first tooth in contact with a cross 19, as it moves on the sprocket, will drive the chain, and this will occur only until the next tooth contacts the next link coming onto the sprocket. The combinations of the chain links being longer than the spacing between adjacent sprockets and the edges 32 being in contact with the shoulders forces the arcuate portions 19 out of complete contact with the sprocket except for the initial contact, as previously explained.

I claim:

1. A chain drive comprising: a sprocket including a hub with angularly spaced outer sprocket teeth projecting outwardly from base areas between the teeth; rigid annular axial shoulders concentric with the sprocket on opposite sides of the teeth; a chain composed of a plurality of chain links supported on the sprocket teeth, the links being U-shaped and joined by link pins at the open and closed ends, the links further having opposed sides for disposition alongside opposite sides of the teeth, and an integral transverse portion connecting the sides and adapted for disposition between the sprocket teeth and for engagement therewith, the transverse portion having outer and inner edges continuous with and substantially in the same plane as outer and inner edges respectively of the opposed sides with the inner of the transverse edges facing and spaced from the base areas between the teeth and the inner edges on the opposed sides riding on the annular shoulders to retain the transverse inner edge radially outwardly of and out of contact with the base areas between the sprocket teeth.

2. The invention as set forth in claim 1 in which the transverse portion of each link is arcuate shaped in respect to its transverse dimension and the sprocket teeth contact the convex outer side of the transverse portion.

3. The invention as set forth in claim 1 in which the pitch length of the links in the chain is greater than the pitch length between the sprocket teeth as measured at the areas of chain contact on the teeth.

4. The invention as set forth in claim 1 in which the annular shoulders are radially inwardly of the teeth.

5. A chain and sprocket assembly comprising a sprocket structure having a hub portion, outer sprocket teeth, and a pair of annular axial extending shoulders adjacent the base of the teeth concentric with the hub axis and projecting to opposite sides of the sprocket, and a chain composed of interconnected links with each link having a pair of opposed vertical sides with radially inner longitudinal edges adapted to engage the shoulders as the chain is played around the sprocket, with the ends of each of said sides extending alongside the ends of the sides of adjacent links and being connected thereto by pins, and each of said links having an integral transverse portion extending between the end of the respective link for closing that end and having a lower edge in substantial transverse continuation with the longitudinal edges, the transverse portion being disposed between the teeth of the sprocket and adapted for contact with the sides of the teeth when the chain is played around the teeth, and said shoulders being disposed sufficiently close to the base of the teeth so as to prevent the transverse edge from contacting the base of the teeth.